United States Patent
Ueshima et al.

(10) Patent No.: US 7,408,650 B2
(45) Date of Patent: Aug. 5, 2008

(54) OPTICAL-AXIS DEFLECTION TYPE LASER INTERFEROMETER, CALIBRATION METHOD THEREOF, CORRECTING METHOD THEREOF, AND MEASURING METHOD THEREOF

(75) Inventors: Yasushi Ueshima, Tsukuba (JP); Naoyuki Taketomi, Tsukuba (JP); Makoto Abbe, Tsukuba (JP)

(73) Assignee: Mitutoyo Corporation, Kawaski-shi (JP)

( * ) Notice: Subject to any disclaimer, the term of this patent is extended or adjusted under 35 U.S.C. 154(b) by 0 days.

(21) Appl. No.: 11/842,489

(22) Filed: Aug. 21, 2007

(65) Prior Publication Data

US 2008/0049211 A1   Feb. 28, 2008

(30) Foreign Application Priority Data

Aug. 25, 2006   (JP) .............................. 2006-229164

(51) Int. Cl.
*G01B 11/02* (2006.01)
(52) U.S. Cl. ..................................... 356/498; 356/4.09
(58) Field of Classification Search ................ 356/4.09, 356/485, 486, 492, 493, 496, 498
See application file for complete search history.

(56) References Cited

U.S. PATENT DOCUMENTS 6,147,748 A * 11/2000 Hughes ...................... 356/4.09
6,870,605 B2 * 3/2005 Osawa et al. ............... 356/4.09
2003/0179362 A1 * 9/2003 Osawa et al. ............... 356/4.09
2007/0024861 A1 * 2/2007 Yanaka et al. ............... 356/498

FOREIGN PATENT DOCUMENTS

DE    20 2004 007 647   9/2004
EP          0 919 830    6/1999
EP          1 750 085    2/2007

OTHER PUBLICATIONS

Design of a High-Accuracy CMM Based on Multi-Lateration Techniques, E.B. Hughes et al., Jan. 7, 2000, Annals of the CIRP vol. 49/1/2000, pp. 391-394.

* cited by examiner

*Primary Examiner*—Tarifur R Chowdhury
*Assistant Examiner*—Jonathan M Hansen
(74) *Attorney, Agent, or Firm*—Rankin, Hill & Clark LLP (57) ABSTRACT

An optical-axis deflection type laser interferometer includes a reference ball serving as a measurement reference, a retroreflecting means disposed at an object to be measured, a laser interferometer length measuring apparatus outputting a measurement value between the apparatus and the retroreflecting means, and a rotational mechanism that rotates a beam projected from the laser interferometer length measuring apparatus around the reference ball. The laser interferometer additionally includes a displacement gauge that measures an error caused by a relative motion between the reference ball and the laser interferometer length measuring apparatus, and a rectilinear movement mechanism that displaces these in a direction of an optical axis of a measurement beam with respect to the reference ball while maintaining a relative positional relationship between the laser interferometer length measuring apparatus and the displacement gauge. With this structure, calibrating the displacement gauge without preparing a special calibrating device becomes possible, thereby securing traceability thereby securing traceability.

10 Claims, 5 Drawing Sheets

OPTICAL-AXIS DEFLECTION TYPE LASER INTERFEROMETER, CALIBRATION METHOD THEREOF, CORRECTING METHOD THEREOF, AND MEASURING METHOD THEREOF

CROSS-REFERENCE TO RELATED APPLICATION

The disclosure of Japanese Patent Application No. 2006-229164 filed on Aug. 25, 2006 including specifications, drawings and claims is incorporated herein by reference in its entirety.

BACKGROUND OF THE INVENTION

1. Field of the Invention

The present invention relates to an optical-axis deflection type laser interferometer that includes a reference ball serving as a measurement reference, a retroreflecting means disposed at an object to be measured, a laser interferometer length measuring apparatus that outputs a measurement value according to an increase or a decrease in distance between the apparatus and the retroreflecting means, and a rotational mechanism that rotates a beam projected from the laser interferometer length measuring apparatus around the reference ball, the laser interferometer measuring a distance between the laser interferometer and the retroreflecting means that makes an optical axis of an outgoing beam projected from the laser interferometer length measuring apparatus mounted on the rotational mechanism and an optical axis of a return beam returned to the laser interferometer length measuring apparatus parallel to each other, based on center coordinates of the reference ball. The present invention relates to a calibration method of the laser interferometer, relates to a correcting method of the laser interferometer, and relates to a measuring method of the laser interferometer. More specifically, the present invention relates to an optical-axis deflection type laser interferometer that can secure traceability by the length standard without using a special device, relates to a calibration method thereof, relates to a correcting method thereof, and relates to a measuring method thereof.

2. Description of the Related Art

Figure 1:
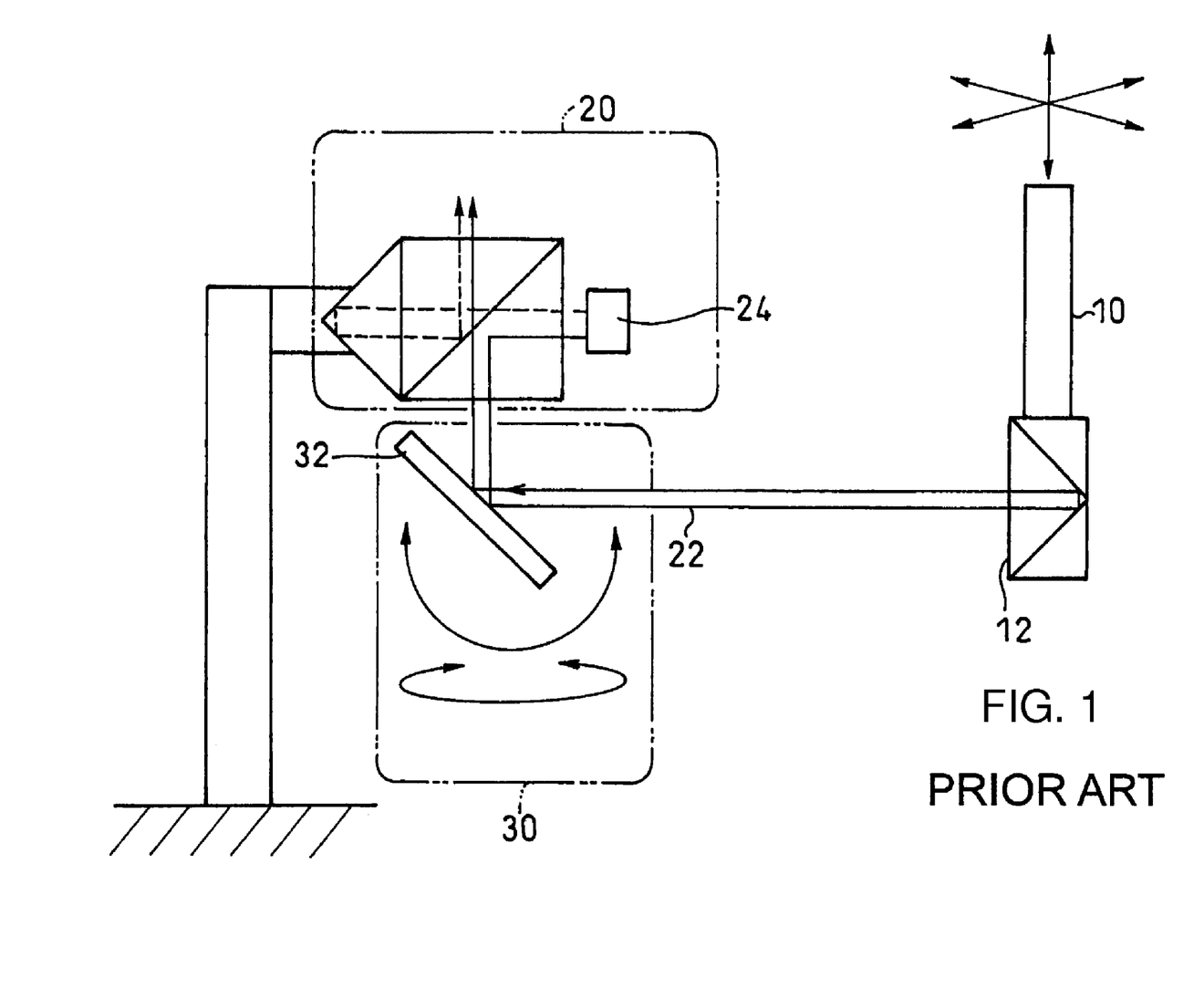
FIG. 1 is an optical path diagram showing an example of an optical system of an optical-axis deflection type laser interferometer.

An optical-axis deflection type laser interferometer (also called a "tracking laser interferometer") is known. This laser interferometer operates in the following way. As shown in FIG. 1, a laser beam (hereinafter, referred to as a "measurement beam") 22 is projected from a laser interferometer length measuring apparatus 20 toward a retroreflecting means (also called a "retroreflector") 12 disposed at a to-be-measured object 10, and is reflected in the backward direction by the retroreflecting means 12. The displacement of the retroreflecting means 12 is detected by use of the interference of the laser beam reflected therefrom, and a tracking operation is performed by use of a change in position of the optical axis of the measurement beam 22 by a two-axis rotational mechanism 30. In FIG. 1, reference numeral 24 designates a light source, and reference numeral 32 designates a deflective plane mirror of the two-axis rotational mechanism 30.

According to this optical-axis deflection type laser interferometer, based on information about the return beam returning from the retroreflecting means 12 that serves as a target, the distance from the apparatus to the target can be measured by the laser interferometer length measuring apparatus 20 with high accuracy.

However, the optical-axis deflection type laser interferometer has technical difficulties in making the precision of the two-axis rotational mechanism 30 as high as the precision in measurement of the laser interferometer. Especially, as in the optical system shown in FIG. 1 in which the direction of the measurement beam 22 is deflected by, for example, the plane mirror 32 attached to the two-axis rotational mechanism 30, the two-axis rotational mechanism 30 has a precision limit, and, in addition, it is difficult to allow a beam to accurately strike the rotational center of the plane mirror 32. These make it difficult to achieve high precision.

Figure 2:
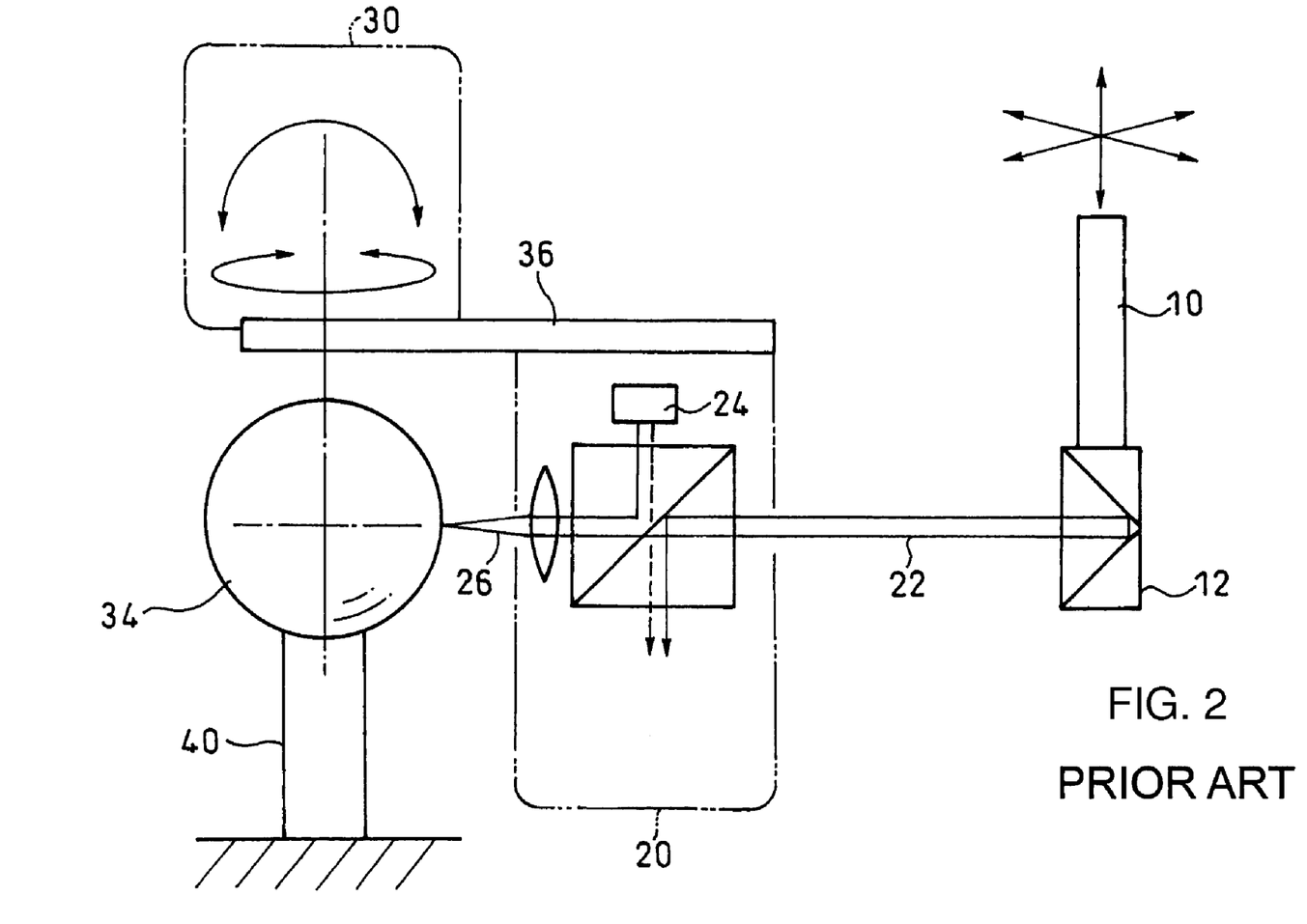
FIG. 2 is an optical path diagram showing an optical system of an optical-axis deflection type laser interferometer disclosed by Patent Document 1.

Therefore, as shown in FIG. 2, European Patent EP0919830A2 (hereinafter, referred to as Patent Document 1) discloses that a relative displacement between the surface of a reference ball 34 disposed at the center of the two-axis rotational mechanism 30 and the laser interferometer length measuring apparatus 20 is measured with a laser beam 26 projected in the exactly opposite direction with respect to the target (12), in addition to the measurement of the retroreflecting means 12 serving as a target. In FIG. 2, reference numeral 36 designates a carriage used to mount the laser interferometer length measuring apparatus 20 on the two-axis rotational mechanism 30, and reference numeral 40 designates a support used to fasten the reference ball 34.

However, the optical system disclosed by Patent Document 1 has a disorder of an interference wavefront or a reduction in light quantity with respect to a rotational error (i.e., runout) in a direction perpendicular to the optical axis. Additionally, it has become apparent that the optical system is not necessarily robust in respect of a change in the optical path length. Therefore, high-cost specifications are required for the rotational accuracy of the two-axis rotational mechanism 30. Additionally, the problem of the light quantity ratio of the laser interferometer length measuring apparatus 20 is included therein. In more detail, the laser interferometer length measuring apparatus 20 measures a phase difference between a reference beam whose optical path is unchangeably fixed there inside and a measurement beam 22 that travels toward the target (12) and that returns backwardly therefrom. Therefore, if there is a great difference in light quantity between the reference beam of light and the measurement beam of light, the contrast of interference fringes cannot be sufficiently secured, and, as a result, interference measurement cannot be performed with high accuracy. However, in the optical system disclosed by Patent Document 1, the measurement beam is first projected and reflected to and from the reference ball 34, and is then projected and reflected to and from the target (12). The light quantity of the measurement beam that has returned in this way is remarkably attenuated, and hence a difference in light quantity with respect to the reference beam that is generally regarded as not being easily attenuated causes a large problem.

On the other hand, the present applicant proposes an optical system shown in FIG. 3 in Japanese Published Unexamined Patent Application No. 2007-57522 (not yet published at the priority date thereof: hereinafter referred to as Patent Document 2). In this prior invention, a motion error of the two-axis rotational mechanism 30 with respect to the reference ball 34 is measured with a displacement gauge 50 separately mounted on a carriage 38 formed integrally with the carriage 36, not with a measurement beam of the laser interferometer length measuring apparatus 20. According to this prior invention, a highly accurate optical-axis deflection type laser interferometer can be, of course, realized with reference to the reference ball 34, and the precision requirement against the two-axis rotational mechanism 30 can be greatly eased without sacrificing robustness with respect to an error component in the direction perpendicular to the optical axis. Additionally, according to this prior invention, the measurement beam of the laser interferometer length measuring apparatus 20 is projected only onto the target (12), and hence the disadvantage of the attenuation of the measurement beam that becomes a problem in the technique of Patent Document 1 is greatly reduced.

However, in this prior invention, a motion error in the direction of the optical axis of the two-axis rotational mechanism 30 with respect to the reference ball 34 is detected, and hence there is a need to additionally provide the displacement gauge 50. Since the optical-axis deflection type laser interferometer has been expected to perform highly accurate measurement that is traceable to the length standard, the technique to secure the traceability of the displacement gauge 50 has been expected to be achieved.

SUMMARY OF THE INVENTION

The present invention has been made to solve the conventional problems. It is therefore an object of the present invention to construct a structure capable of calibrating a displacement gauge used to correct an error in the direction of the optical axis resulting from the motion accuracy of a two-axis rotational mechanism with respect to a reference ball of an optical-axis deflection type laser interferometer, without preparing a special calibrating device, on the operating instrument, thus securing traceability.

In an optical-axis deflection type laser interferometer, the present invention employs a structure in which a laser interferometer length measuring apparatus that measures the amount of positional change in a target, an optical axis thereof, a displacement gauge to be calibrated, and the direction of detection sensitivity thereof are aligned together. To achieve the object, an optical-axis deflection type laser interferometer of the present invention includes a reference ball serving as a measurement reference, a retroreflecting means disposed at an object to be measured, a laser interferometer length measuring apparatus that outputs a measurement value according to an increase or a decrease in distance between the apparatus and the retroreflecting means, and a rotational mechanism that rotates a beam projected from the laser interferometer length measuring apparatus around the reference ball, and the optical-axis deflection type laser interferometer measures a distance between the laser interferometer and the retroreflecting means that makes an optical axis of an outgoing beam projected from the laser interferometer length measuring apparatus mounted on the rotational mechanism and an optical axis of a return beam returned to the laser interferometer length measuring apparatus parallel to each other, based on center coordinates of the reference ball. The laser interferometer is characterized by further including a displacement gauge that measures an error caused by a relative motion between the reference ball and the laser interferometer length measuring apparatus, and a rectilinear movement mechanism that displaces these in a direction of an optical axis of a measurement beam with respect to the reference ball while maintaining a relative positional relationship between the laser interferometer length measuring apparatus and the displacement gauge.

The displacement gauge maybe disposed on both sides of the reference ball.

The displacement gauge may be an electrical capacitance type displacement gauge or an eddy current type displacement gauge.

The laser interferometer length measuring apparatus may be a Michelson interferometer.

The reference ball may be a commercially available metallic ball.

The present invention additionally provides a calibration method of the optical-axis deflection type laser interferometer characterized in that, referring only to a measurement value of the laser interferometer length measuring apparatus that is traceable to the length standard, calibration data of the displacement gauge is acquired by comparative measurement with the laser interferometer length measuring apparatus.

In more detail, the calibration method can include a step of fixing the retroreflecting means near the optical-axis deflection type laser interferometer, a step of allowing a measurement beam of the optical-axis deflection type laser interferometer to strike the retroreflecting means, a step of operating the rectilinear movement mechanism and giving a displacement for calibration, a step of recording a measurement value of the laser interferometer length measuring apparatus and a measurement value of the displacement gauge obtained at that time, and a step of calculating a calibration value of the displacement gauge in accordance with acquired data when data acquisition is completed and storing or recording the calibration value.

The present invention additionally provides a correcting method of the optical-axis deflection type laser interferometer characterized in that a correcting operation is performed by using the calibration data of the displacement gauge obtained by the comparative measurement with the laser interferometer length measuring apparatus.

The present invention additionally provides a measuring method of the optical-axis deflection type laser interferometer characterized in that a distance between the apparatus and the to-be-measured object or a displacement is measured traceably by the length standard by performing a correcting operation according to the above correcting method.

In more detail, the measuring method can include a step of fixing the retroreflecting means near the optical-axis deflection type laser interferometer, a step of allowing a measurement beam of the optical-axis deflection type laser interferometer to strike the retroreflecting means, a step of operating the rectilinear movement mechanism and giving a displacement for calibration, a step of recording a measurement value of the laser interferometer measuring apparatus and a measurement value of the displacement gauge obtained at that time, a step of calculating a calibration value of the displacement gauge in accordance with acquired data when data acquisition is completed and storing or recording the calibration value, and a step of attaching the retroreflecting means to an object to be measured and starting a measuring operation.

Alternatively, the measuring method can include a step of fixing the retroreflecting means near the optical-axis deflection type laser interferometer, a step of allowing a measurement beam of the optical-axis deflection type laser interferometer to strike the retroreflecting means, a step of operating the rectilinear movement mechanism and giving a displacement for calibration, a step of storing a measurement value of the laser interferometer length measuring apparatus and a measurement value of the displacement gauge obtained at that time, a step of calculating a calibration value of the displacement gauge in accordance with acquired data when data acquisition is completed and storing or recording the calibration value, a step of attaching the retroreflecting means to an object to be measured and starting a measuring operation, and a step of correcting the measurement value by using the calibration value of the displacement gauge.

According to the present invention, it is possible to calibrate the displacement gauge used to correct an error in the direction of the optical axis resulting from the motion accuracy of the rotational mechanism with respect to the reference ball of the optical-axis deflection type laser interferometer. A calibrating operation for this can be easily performed in an operating state of the optical-axis deflection type laser interferometer, and a special device is not required to be prepared to calibrate the displacement gauge. As a result, a highly accurate optical-axis deflection type laser interferometer can be realized at low cost.

Additionally, the calibration of the displacement gauge can be performed by referring only to the measurement value of the laser interferometer length measuring apparatus that is provided in the optical-axis deflection type laser interferometer and that is traceable to the length standard. Therefore, the to-be-calibrated displacement gauge automatically becomes traceable to the length standard, and hence it becomes possible to also perform a calibrating operation that is traceable to the length standard, not only to correct the sensitivity and the nonlinear error of the displacement gauge. Therefore, it is possible to secure traceability by the length standard, which has not easily been achieved by the conventional technique.

At this time, for example, if a He—Ne wavelength-stabilizing laser having an emission wavelength of 633 nm is employed as a light source, and if the emission wavelength (emission frequency) thereof is calibrated by the comparative measurement with a wavelength-stabilizing laser by an iodine absorption line that is an upper standard, the calibration of the displacement gauge that is traceable to the length standard can be automatically achieved. Additionally, this makes it possible to secure traceability as the whole of the optical-axis deflection type laser interferometer system with ease and at low cost.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

An embodiment of the present invention will be hereinafter described in detail with reference to the accompanying drawings.

Figure 3:
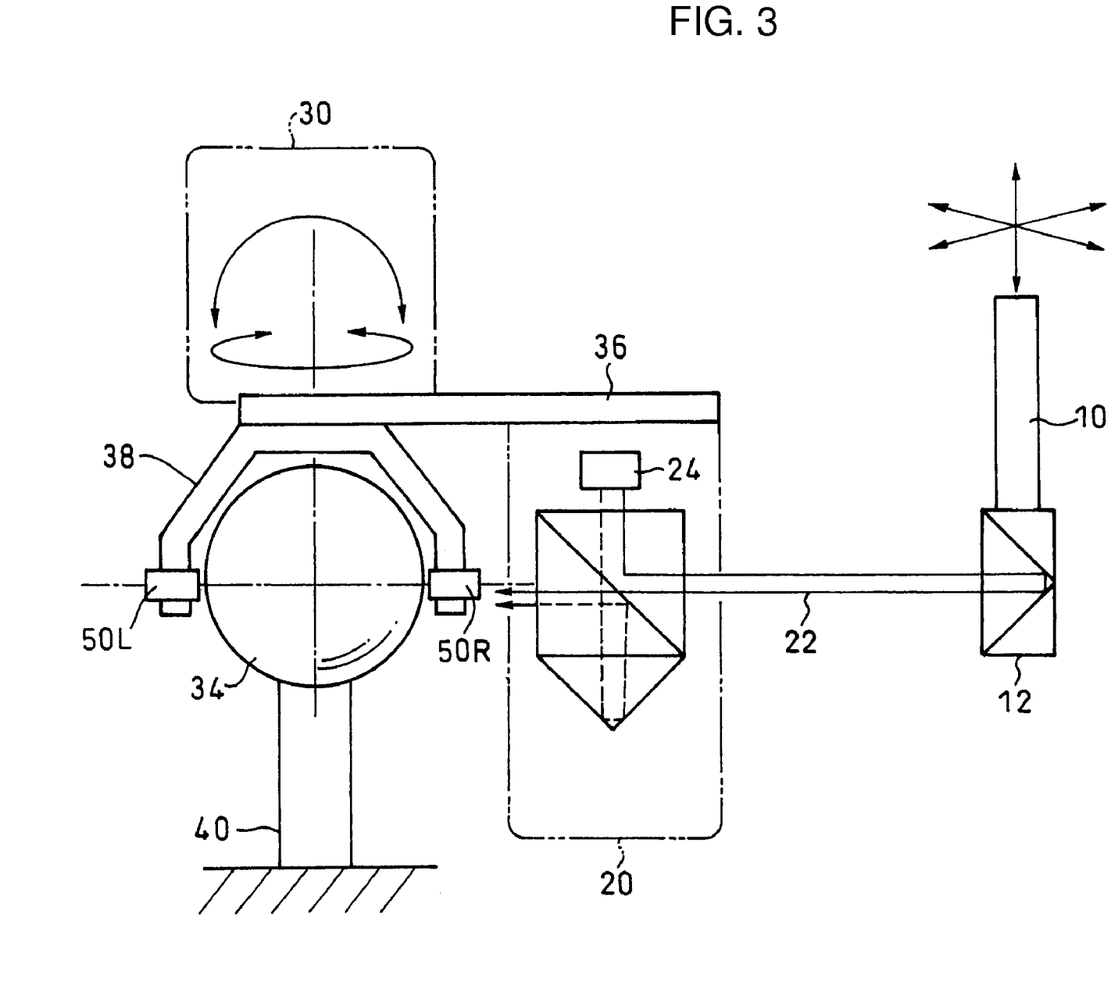
FIG. 3 is an optical path diagram showing an optical system of an optical-axis deflection type laser interferometer proposed by the present applicant in Patent Document 2.
Figure 4:
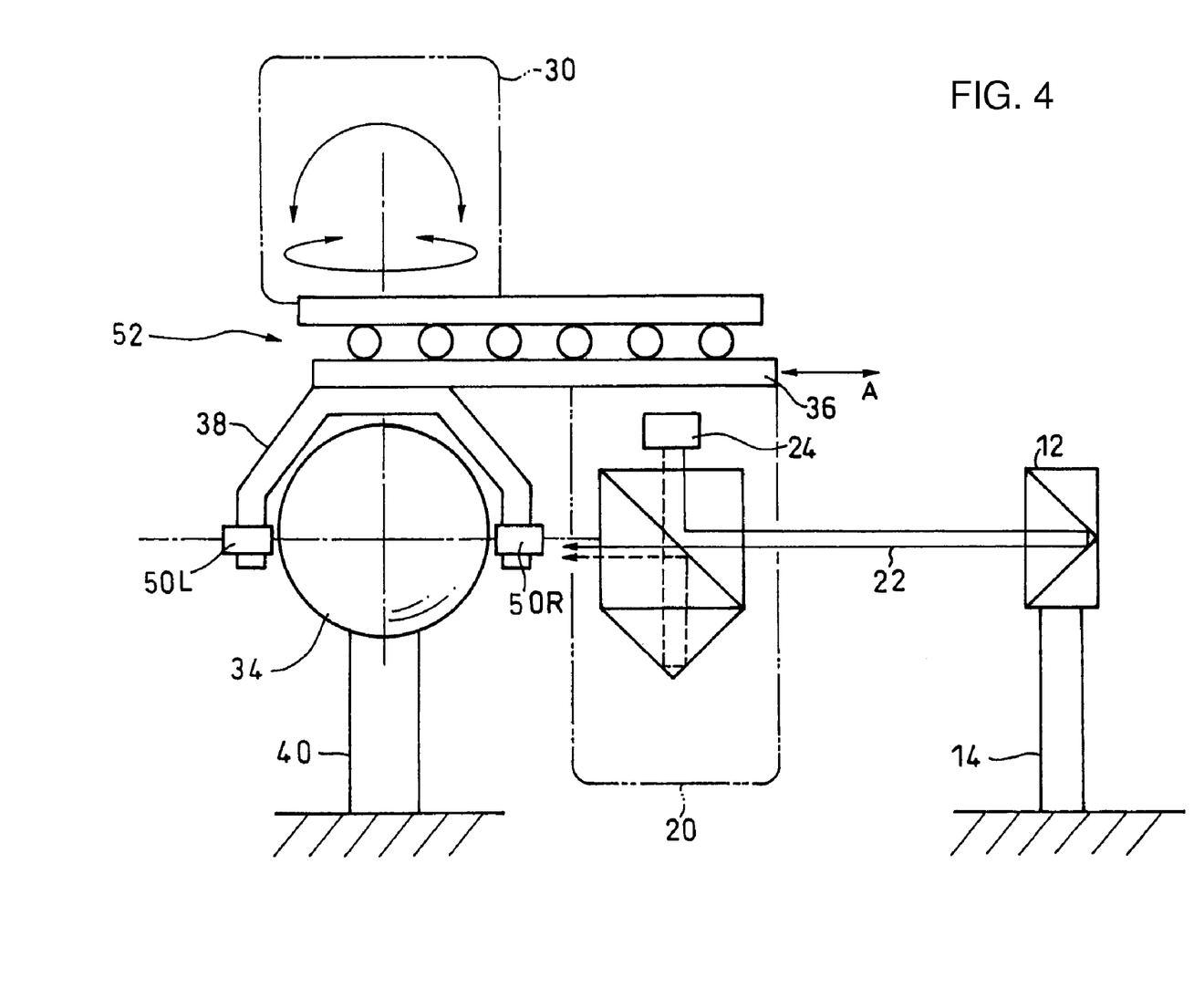
FIG. 4 shows an embodiment of the present invention.

In this embodiment, a rectilinear movement mechanism 52 that enables a movement in the direction of a measurement optical axis (i.e., in the direction indicated by arrow "A") is provided between a two-axis rotational mechanism 30 and carriages 36 and 38 that are mechanical components formed integrally with a laser interferometer length measuring apparatus 20 and with displacement gauges 50R and 50L as shown in FIG. 4, in addition to the prior invention that has been proposed by the present applicant in Patent Document 2 as shown in FIG. 3. A movement in the direction of the measurement optical axis by the rectilinear movement mechanism 52 is performed together with the laser interferometer length measuring apparatus 20 and the displacement gauges 50R and 50L.

Therefore, once the displacement gauges 50R and 50L are calibrated, the system of FIG. 4 can operate as an optical-axis deflection type laser interferometer in which the central coordinate of a reference ball 34 is regarded as a fixed reference.

For example, a Michelson interferometer can be used as the laser interferometer length measuring apparatus 20.

For example, a commercially available metallic ball can be used as the reference ball 34. This ball is industrially widely used, and is low in cost. A ceramic ball, a semiconducting ball, a glass ball, or a metal-coated ball can be used as the reference ball 34, besides such a metallic ball. However, if an eddy current sensor is used as the displacement gauge, a metallic ball or a metal-coated ball must be used as the reference ball 34.

For example, an electrical capacitance type displacement gauge or an eddy current type displacement gauge can be used as the displacement gauges 50R and 50L. Each of these displacement gauges has a sensor having a larger effective area than a dust size or a flaw size and having relatively low lateral resolution of the sensor, and hence is insusceptible to dust or flaws existing on the surface of the reference ball 34. A fiber sensor or various contact type displacement sensors can be used as the displacement gauge. As in the present embodiment, this displacement gauge can be disposed at both sides of the reference ball 34 so as to reduce the influence of a temperature change.

Displacement measurement in this embodiment is performed as follows.

In detail, the amount $\Delta L$ of change in length (i.e., displacement) between the fixed reference ball 34 used as a positional reference point and the retroreflecting means 12 is calculated by the following equation.

$$\Delta L = (\Delta L_2 - \Delta L_3)/2 + \Delta L_1 \qquad (1)$$

Herein, $\Delta L_1$ is a relative displacement (on the supposition that the direction in which a distance is increased is positive +) between the laser interferometer length measuring apparatus 20 and the retroreflecting means 12, which is measured by using the laser interferometer length measuring apparatus 20. $\Delta L_2$ is a relative displacement (on the supposition that the direction in which a distance is increased is positive +) between the displacement gauge 50R, which is disposed between the laser interferometer length measuring apparatus 20 and the reference ball 34, and the surface of the reference ball 34. $\Delta L_3$ a relative displacement (on the supposition that the direction in which a distance is increased is positive +) between the displacement gauge 50L and the surface of the reference ball 34.

The surface of the highly-accurate reference ball 34 is constant in the distance from the center of the reference ball 34 with high accuracy. Therefore, the displacement of the retroreflecting means 12 based on the center of the reference ball 34 can be measured with high accuracy even when the carriage 38 rotates around the center of the reference ball 34.

The measurement of $\Delta L_1$ can be performed according to a measuring method using the well-known Michelson interferometer in which the retroreflecting means 12 is an object to be measured, and is disclosed by Patent Documents 1 and 2, and hence a detailed description of this is omitted.

Additionally, the automatic tracking method of the retroreflecting means 12 is the same as the method disclosed by Patent Documents 1 and 2, and hence a description of this is omitted.

Figure 5:
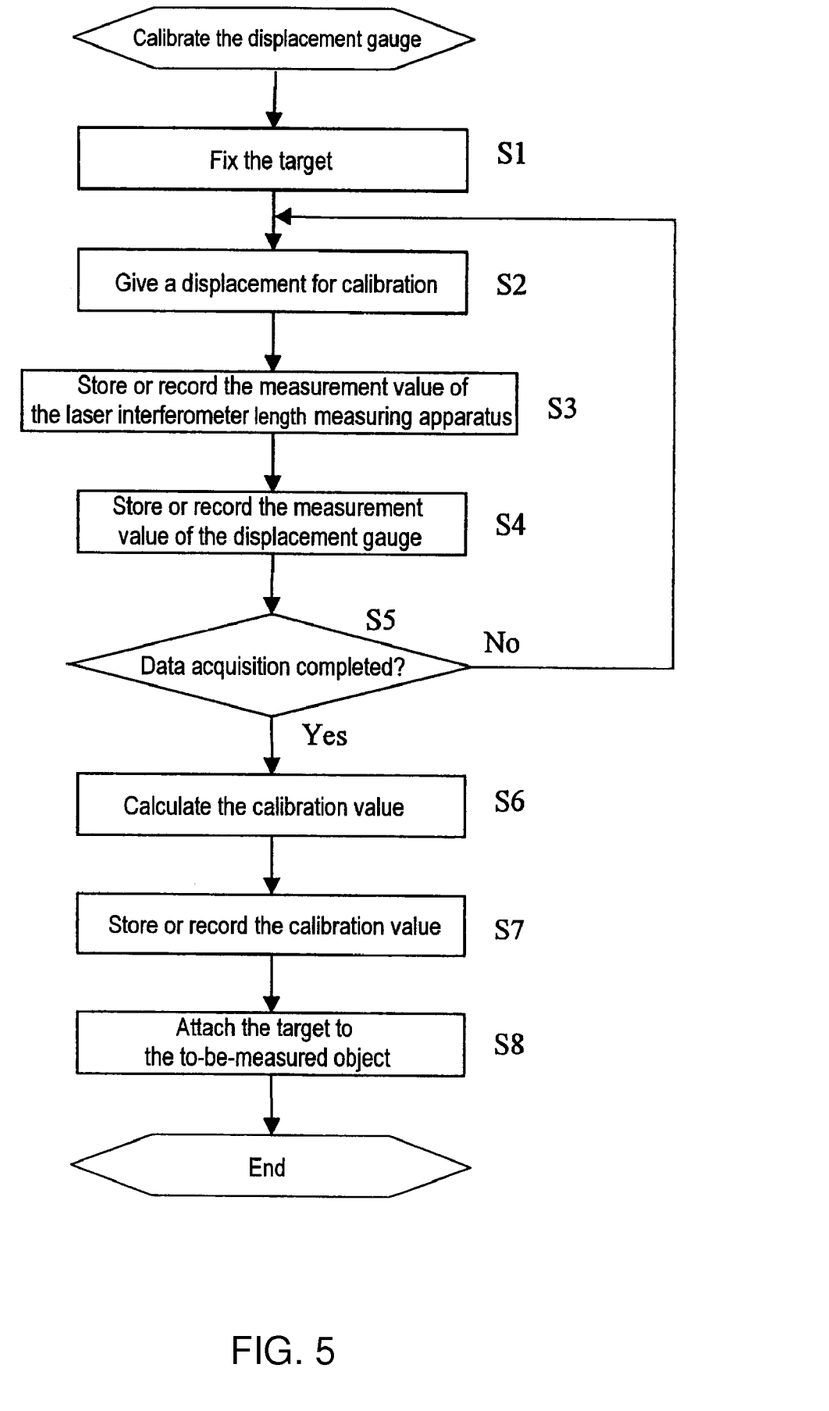
FIG. 5 is a flowchart that shows calibrating steps of a displacement gauge in the embodiment.

A series of steps for the calibration of the displacement gauge according to the present invention are performed as shown in FIG. 5.

These are hereinafter described in detail.

(1) As shown in FIG. 4, the retroreflecting means 12 that serves as a target is simply fixed near the optical-axis deflection type laser interferometer by use of, for example, a support 14 (step S1).

(2) A measurement beam 22 of the optical-axis deflection type laser interferometer is allowed to strike the retroreflecting means 12.

(3) The rectilinear movement mechanism 52, which is a mechanism that generates a displacement used to calibrate the displacement gauge, is moved in the direction of arrow "A" shown in FIG. 4 so as to give a displacement for calibration (step S2). The measurement value of the laser interferometer length measuring apparatus 20 (step S3) and the measurement values of the displacement gauges 50R and 50L obtained at this time are stored or recorded into, for example, a data memory (step S4).

Steps S2 to S4 are repeatedly performed until data acquisition is completed.

(4) When it is determined that data acquisition has been completed at step S5, the calibration values of the displacement gauges 50R and 50L are calculated according to, for example, a least squares method based on the acquired data (step S6), and are stored or recorded into, for example, a data memory (step S7).

(5) The displacement gauge is corrected with reference to the calibration curve of the displacement gauge obtained above.

(6) As shown in FIG. 3, the retroreflecting means 12 serving as a target is attached to the to-be-measured object 10, and measurement starts to be performed (step S8).

In this embodiment, the displacement gauges 50R and 50L are disposed at both sides of the reference ball 34, respectively, and hence the temperature drift of output projected from the displacement gauge can be compensated. In detail, if the right and left displacement gauges 50R and 50L are the same in the tendency of the temperature drift of output projected therefrom, the displacement $\Delta L$ obtained by Equation (1) will not be affected by the temperature drift of the output of the displacement gauge. For example, let it be supposed that an error $\Delta D$ caused by the temperature drift arises in the amount $\Delta L_2$ of change measured by the right displacement gauge 50R so as to come to $\Delta L_2 + \Delta D$. If the right and left displacement gauges 50R and 50L are the same in the tendency of the temperature drift, the same error as in the right displacement gauge 50R which is caused by the temperature drift will arise in the amount $\Delta L_3$ of change measured by the left displacement gauge 50L at this time so as to come to $\Delta L_3 + \Delta D$. At this time, the displacement $\Delta L$ is expressed by the following equation without being affected by the temperature drift of the displacement gauge.

$$\Delta L = \{(\Delta L_2 + \Delta D) - (\Delta L_3 + \Delta D)\}/2 + \Delta L_1 \quad (2)$$
$$= (\Delta L_2 - \Delta L_3)/2 + \Delta L_1$$

Likewise, if the reference ball 34 is isotropically and thermally expanded, the thermal expansion of the reference ball 34 can be compensated.

Therefore, when the displacement gauges 50R and 50L are provided at both sides of the reference ball 34, a system that is robust against the temperature deformation can be constructed.

Any of the amount $\Delta L_2$, the amount $\Delta L_3$, and a difference therebetween (i.e. $\Delta L_2 - \Delta L_3$) can be regarded as being calibrated according to the present invention.

Additionally, the apparatus in this embodiment is very robust also against the runout of the rotational mechanism. In detail, even if the entire carriage is positionally changed in the direction of the optical axis of a measurement beam of the laser interferometer length measuring apparatus 20 when the carriage 38 rotates around the reference ball 34, the displacement $\Delta L$ calculated as above is not affected by this positional change.

For example, let it be supposed that the entire carriage has been displaced by $\Delta D$ in the direction of the retroreflecting means 12. If so, $\Delta L_1$ comes to $\Delta L_1 - \Delta D$, $\Delta L_2$ comes to $\Delta L_2 + \Delta D$, and $\Delta L_3$ comes to $\Delta L_3 - \Delta D$. Therefore, $\Delta L$ is expressed as follows.

$$\Delta L = \{(\Delta L_2 + \Delta D) - (\Delta L_3 + \Delta D)\}/2 + (\Delta L_1 - \Delta D) \quad (3)$$
$$= (\Delta L_2 - \Delta L_3)/2 + \Delta L_1$$

Thus, even if the carriage 38 is positionally changed in the direction of the optical axis of a measurement beam, the displacement $\Delta L$ calculated as above is not affected by this positional change.

Additionally, even if the entire carriage is positionally changed (rectilinearly) in the direction perpendicular to the optical axis of a measurement beam when the carriage 38 rotates around the reference ball 34, the displacement $\Delta L$ calculated as above is not affected by this positional change. First, $\Delta L_1$ is not affected by this positional change. There is no change in the forward and backward optical path lengths between the laser interferometer length measuring apparatus 20 and the retroreflecting means 12 even if the laser interferometer measuring apparatus 20 is displaced in the direction perpendicular to the optical axis of a measurement beam. Therefore, $\Delta L_1$ is not affected by this displacement (i.e. positional change). This results from the properties of the retroreflecting means 12. Next, if the displacement gauge 50R is displaced in the direction perpendicular to the optical axis of a measurement beam so that the value of $\Delta L_2$ increases by $\Delta E$, the value of $\Delta L_3$ will increase by $\Delta E$ correspondingly. At this time, $\Delta L$ is expressed as follows.

$$\Delta L = \{(\Delta L_2 + \Delta E) - (\Delta L_3 - \Delta E)\}/2 + \Delta L_1 \quad (4)$$
$$= (\Delta L_2 - \Delta L_3)/2 + \Delta L_1$$

Therefore, even if the entire carriage is positionally changed in the direction perpendicular to the optical axis of a measurement beam, the displacement $\Delta L$ calculated as above is not affected by this positional change.

As described above, even if the laser interferometer length measuring apparatus 20 is displaced in the direction of the optical axis of a measurement beam, and/or is displaced in the direction perpendicular to the optical axis of a measurement beam, $\Delta L$ is not affected by these positional changes in this embodiment. Therefore, the apparatus in this embodiment is very robust against the runout of the rotational mechanism.

It should be noted that $\Delta L$ can be measured, for example, by arranging the displacement gauge only on the side of the retroreflecting means 12. In this case, the displacement $\Delta L$ is calculated according to the following equation.

$$\Delta L = \Delta L_2 + \Delta L_1 \quad (5)$$

Herein, $\Delta L_2$ and $\Delta L_1$ are defined in the same way as in Equation (1).

In this case, since the number of displacement gauges to be used is one, the apparatus can be produced at low cost.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. An optical-axis deflection type laser interferometer comprising:
    a reference ball serving as a measurement reference;
    a retroreflecting means disposed at an object to be measured;
    a laser interferometer length measuring apparatus that outputs a measurement value according to an increase or a decrease in distance between the apparatus and the retroreflecting means; and
    a rotational mechanism that rotates a beam projected from the laser interferometer length measuring apparatus around the reference ball;
    the optical-axis deflection type laser interferometer measuring a distance between the laser interferometer and the retroreflecting means that makes an optical axis of an outgoing beam projected from the laser interferometer length measuring apparatus mounted on the rotational mechanism and an optical axis of a return beam returned to the laser interferometer length measuring apparatus parallel to each other, based on center coordinates of the reference ball;
    wherein the improvement comprises:
    a displacement gauge that measures an error caused by a relative motion between the reference ball and the laser interferometer length measuring apparatus; and
    a rectilinear movement mechanism that displaces the displacement gauge and the laser interferometer length measuring apparatus in a direction of an optical axis of a measurement beam with respect to the reference ball while maintaining a relative positional relationship between the laser interferometer length measuring apparatus and the displacement gauge.

2. The optical-axis deflection type laser interferometer according to claim 1, wherein the displacement gauge is disposed on both sides of the reference ball.

3. The optical-axis deflection type laser interferometer according to claim 1, wherein the displacement gauge is an electrical capacitance type displacement gauge or an eddy current type displacement gauge.

4. The optical-axis deflection type laser interferometer according to claim 1, wherein the laser interferometer measuring apparatus is a Michelson interferometer.

5. The optical-axis deflection type laser interferometer according to claim 1, wherein the reference ball is a commercially available metallic ball.

6. A calibration method of an optical-axis deflection type laser interferometer,
    the optical-axis deflection type laser interferometer comprising:
    a reference ball serving as a measurement reference;
    a retroreflecting means disposed at an object to be measured;
    a laser interferometer length measuring apparatus that outputs a measurement value according to an increase or a decrease in distance between the apparatus and the retroreflecting means;
    a rotational mechanism that rotates a beam projected from the laser interferometer length measuring apparatus around the reference ball;
    a displacement gauge that measures an error caused by a relative motion between the reference ball and the laser interferometer length measuring apparatus; and
    a rectilinear movement mechanism that displaces the displacement gauge and the laser interferometer length measuring apparatus in a direction of an optical axis of a measurement beam with respect to the reference ball while maintaining a relative positional relationship between the laser interferometer length measuring apparatus and the displacement gauge;
    the optical-axis deflection type laser interferometer measuring a distance between the laser interferometer and the retroreflecting means that makes an optical axis of an outgoing beam projected from the laser interferometer length measuring apparatus mounted on the rotational mechanism and an optical axis of a return beam returned to the laser interferometer length measuring apparatus parallel to each other, based on center coordinates of the reference ball;
    the calibration method comprising:
    a step of fixing the retroreflecting means near the optical-axis deflection type laser interferometer;
    a step of allowing a measurement beam of the optical-axis deflection type laser interferometer to strike the retroreflecting means;
    a step of operating the rectilinear movement mechanism and giving a displacement for calibration;
    a step of storing or recording a measurement value of the laser interferometer length measuring apparatus and a measurement value of the displacement gauge obtained at that time; and
    a step of calculating a calibration value of the displacement gauge in accordance with acquired data when data acquisition is completed and storing or recording the calibration value.

7. The calibration method of the optical-axis deflection type laser interferometer according to claim 6, wherein, referring only to a measurement value of the laser interferometer length measuring apparatus, calibration data of the displacement gauge is acquired by comparative measurement with the laser interferometer length measuring apparatus.

8. A correcting method of an optical-axis deflection type laser interferometer wherein, according to the calibration method of the optical-axis deflection type laser interferometer according to claim 6, a correcting operation is performed by using the calibration data of the displacement gauge obtained by the comparative measurement with the laser interferometer length measuring apparatus.

9. A measuring method of an optical-axis deflection type laser interferometer,
    the optical-axis deflection type laser interferometer comprising:
    a reference ball serving as a measurement reference;
    a retroreflecting means disposed at an object to be measured;

a laser interferometer length measuring apparatus that outputs a measurement value according to an increase or a decrease in distance between the apparatus and the retroreflecting means;

a rotational mechanism that rotates a beam projected from the laser interferometer length measuring apparatus around the reference ball;

a displacement gauge that measures an error caused by a relative motion between the reference ball and the laser interferometer length measuring apparatus; and a rectilinear movement mechanism that displaces the displacement gauge and the laser interferometer length measuring apparatus in a direction of an optical axis of a measurement beam with respect to the reference ball while maintaining a relative positional relationship between the laser interferometer length measuring apparatus and the displacement gauge;

the optical-axis deflection type laser interferometer measuring a distance between the laser interferometer and the retroreflecting means that makes an optical axis of an outgoing beam projected from the laser interferometer length measuring apparatus mounted on the rotational mechanism and an optical axis of a return beam returned to the laser interferometer measuring apparatus parallel to each other, based on center coordinates of the reference ball;

the measuring method comprising:

a step of fixing the retroreflecting means near the optical-axis deflection type laser interferometer;

a step of allowing a measurement beam of the optical-axis deflection type laser interferometer to strike the retroreflecting means;

a step of operating the rectilinear movement mechanism and giving a displacement for calibration;

a step of storing or recording a measurement value of the laser interferometer length measuring apparatus and a measurement value of the displacement gauge obtained at that time;

a step of calculating a calibration value of the displacement gauge in accordance with acquired data when data acquisition is completed and storing or recording the calibration value; and a step of attaching the retroreflecting means to an object to be measured and starting a measuring operation.

10. A measuring method of an optical-axis deflection type laser interferometer according to claim 9, further comprising:

a step of correcting the measurement value by using the calibration value of the displacement gauge.

* * * * *